(12) United States Patent  (10) Patent No.: US 9,385,822 B2
Cheng  (45) Date of Patent: Jul. 5, 2016

(54) WIDEBAND CALIBRATION METHOD AND WIDEBAND CALIBRATION APPARATUS FOR CALIBRATING MISMATCH BETWEEN FIRST SIGNAL PATH AND SECOND SIGNAL PATH OF TRANSMITTER/RECEIVER

(71) Applicant: Realtek Semiconductor Corp., HsinChu (TW)

(72) Inventor: Ching-Chia Cheng, Hsinchu (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 0 days.

(21) Appl. No.: 14/720,961

(22) Filed: May 25, 2015

(65) Prior Publication Data

US 2015/0349900 A1  Dec. 3, 2015

(30) Foreign Application Priority Data

May 29, 2014  (TW) .............................. 103118847 A (51) Int. Cl.
  *H04B 17/21*  (2015.01)
  *H04B 1/30*  (2006.01)
  *H04L 27/26*  (2006.01)
(52) U.S. Cl.
  CPC .................. *H04B 17/21* (2015.01); *H04B 1/30* (2013.01); *H04L 27/2636* (2013.01)
(58) Field of Classification Search
  CPC .............. H04B 1/10; H04B 1/16; H04B 1/04; H04B 1/0475; H04B 17/0005; H04B 17/0015; H04B 17/0062
  See application file for complete search history.

(56) References Cited

U.S. PATENT DOCUMENTS

| | | | | |
|---|---|---|---|---|
| 9,008,161 | B1* | 4/2015 | Chang ................ | H04B 17/0015 375/219 |
| 2011/0243287 | A1* | 10/2011 | Kitsunezuke ............ | H03D 7/18 375/350 |
| 2013/0266102 | A1* | 10/2013 | Yan .......................... | H04B 1/10 375/350 |
| 2014/0018029 | A1* | 1/2014 | Chang ...................... | H04B 1/10 455/307 |

FOREIGN PATENT DOCUMENTS

CN  102077538 A  5/2011

* cited by examiner

*Primary Examiner* — Nguyen Vo
(74) *Attorney, Agent, or Firm* — Winston Hsu; Scott Margo (57) ABSTRACT

A method for calibrating mismatches of an in-phase signal path and a quadrature signal path of a transmitter, including: utilizing the receiver to receive at least a test signal via the first signal path and the second signal path, wherein each test signal possesses a specific frequency within a specific frequency band; calculating at least a calibration coefficient for each test signal respectively, so as to calibrate mismatch between the first signal path and the second signal path of the receiver with respect to the specific frequency corresponding to each test signal; deriving a tap coefficient of a calibration filter of a calibration filter unit according to the at least a calibration coefficient of each test signal; and utilizing the calibration filter unit to calibrate a received signal.

16 Claims, 11 Drawing Sheets

WIDEBAND CALIBRATION METHOD AND WIDEBAND CALIBRATION APPARATUS FOR CALIBRATING MISMATCH BETWEEN FIRST SIGNAL PATH AND SECOND SIGNAL PATH OF TRANSMITTER/RECEIVER

BACKGROUND OF THE INVENTION

1. Field of the Invention

The disclosed embodiments of the present invention relate to a calibration method and a related calibration circuit, and more particularly, to a calibration method and a related calibration apparatus for calibrating mismatches of an in-phase (I) signal path and a quadrature (Q) signal path of a transmitter/receiver.

2. Description of the Prior Art

Figure 1:
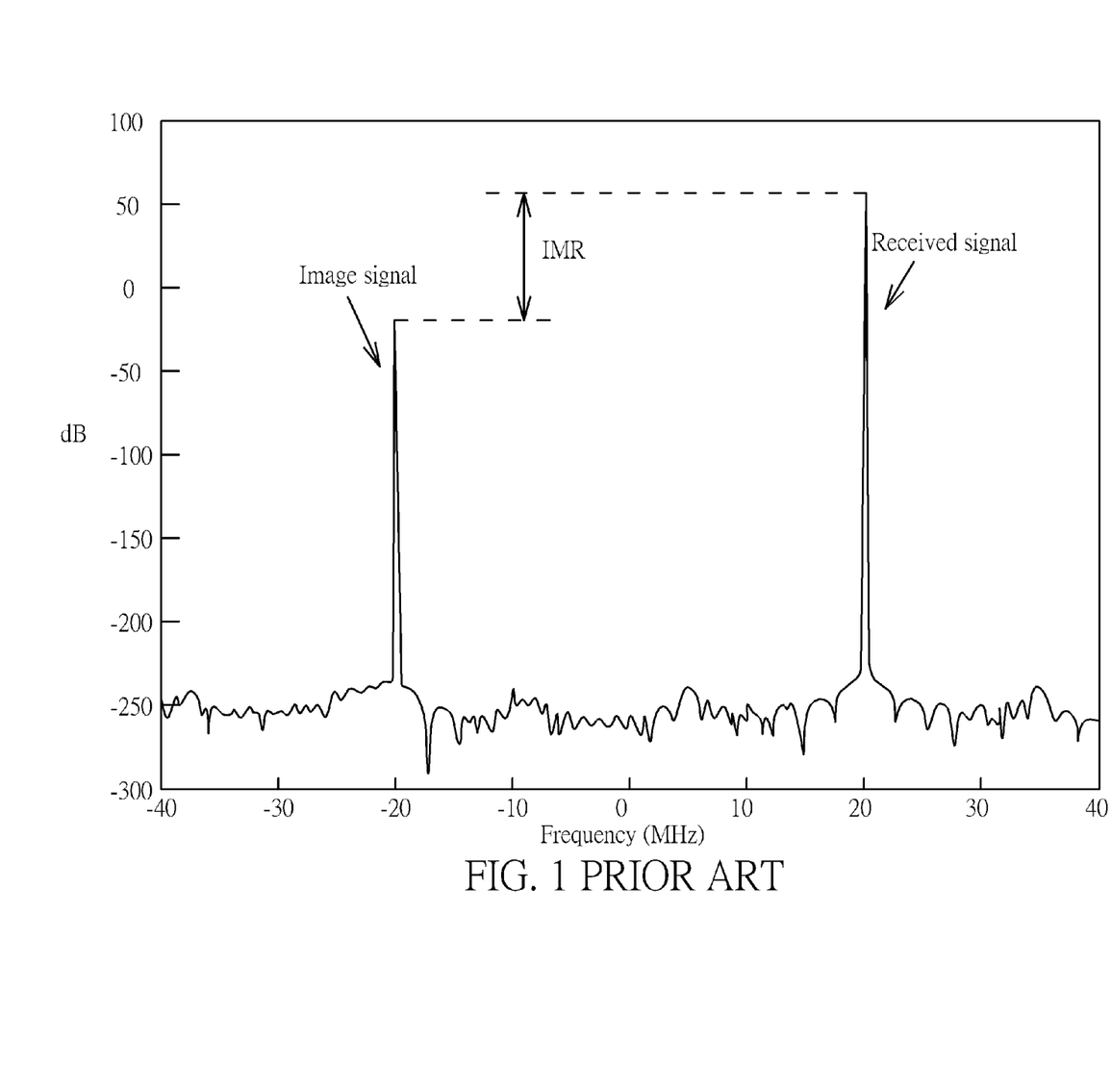
FIG. 1 is a diagram illustrating a received signal received by a receiving terminal and an image signal generated by the received signal.

In general, the modulation technique can comprise more information data when it is more complicated. That is, the modulation technique can increase transmission rate by complicated modulation process, such as the 64-Quadrature Amplitude Modulation (64-QAM), or even the 256-QAM. Thus, the requirement of high level orthogonal amplitude modulation is more and more popular. If the high level orthogonal amplitude modulation is expected to have good transmitting/receiving effect, the Error Vector Magnitude (EVM) of the communication system has to be increased accordingly. One of the important factor affecting the EVM is the level of the In-phase Quadrature-phase imbalance (IQ imbalance). The main cause of the IQ imbalance is the mismatch of IQ signal path of the Radio Frequency (RF) a first signal path and a second signal path of a receiver, and even a small bias will affect the whole communication system, to form an incomplete orthogonal modulation/demodulation procedure, and result in increase of Bit Error Rate (BER) of the receiving terminal. The bias can be separated to the amplitude bias and the phase bias. As long as the biases exist, the image interference of symmetrical frequency will be generated in the spectrum. Please refer to FIG. 1. FIG. 1 is a diagram illustrating a received signal received by a receiving terminal and an image signal generated by the received signal. The difference between the received signal amplitude and the image signal amplitude is called Image Rejection Ratio (IRR) in general. For example, when IQ imbalance is large, IRR will be small, and IQ imbalance is small, IRR will be large.

In order to improve the effect caused by the bias, a calibration will be performed for the circuit when transmitting/receiving signals formally, and the calibration is called IQ calibration. There are two main causes of mismatches of the IQ signal path. One of the main causes is when a local oscillator (LO) generates carrier waves and transmits the carrier waves respectively to the mixers in the I signal path and the Q signal path, it is hard to have a phase difference of 90 degrees, or the amplitudes of the carrier waves respectively transmitted to the mixers in the I signal path and the Q signal path are different (i.e., the above phase bias and amplitude bias). Another one of the main causes is that it is hard to avoid imperfect conditions in the circuit process, and thus two elements in the I signal path and the Q signal path are not totally matched to each other. For example, when there are mismatches between the low-pass filter (LPF), the analog-to-digital converter (ADC), the digital-to-analog converter (DAC, or the gain amplifier in the I signal path and the Q signal path, the signals passing by the I signal path and the Q signal path will have difference. When the signals pass by the IQ signal path with mismatches, the image interference signals will be generated (as shown in FIG. 1) and reduce the signal quality.

For the wideband communication system, the image signal interference for the signals in different frequencies within a frequency band is not always the same. In general, the prior art uses least mean square (LMS) method to find out the best compensation filter to calibrate the image interference signals in the frequency band range. However, the requirement for connecting speed is higher and higher in the wireless communication application nowadays. For example, if there is a phone call coming when a user uses a Bluetooth earphone, the Bluetooth earphone has to connect to the smartphone right away for user to take the phone call. The higher connecting speed can bring a better user experience. Thus, it is an important issue about how to perform the IQ calibration fast and accurately in the area of the communication system.

SUMMARY OF THE INVENTION

It is therefore one of the objectives of the present invention to provide a calibration method and a related calibration apparatus for calibrating mismatches of an in-phase (I) signal path and a quadrature (Q) signal path of a transmitter/receiver, so as to solve the above-mentioned problem.

In accordance with an embodiment of the present invention, an exemplary calibration method for calibrating mismatches of a first signal path and a second signal path of a receiver, wherein one of the first signal path and the second signal path is an in-phase signal path and the other one of the first signal path and the second signal path is a quadrature signal path is disclosed. The calibration method comprises: utilizing the receiver to receive at least a test signal via the first signal path and the second signal path, wherein each test signal possesses a specific frequency within a specific frequency band; calculating at least a calibration coefficient for each test signal respectively, so as to calibrate the mismatches between the first signal path and the second signal path of the receiver with respect to the specific frequency corresponding to each test signal; deriving an equivalent frequency respond corresponding to each test signal according to the at least a calibration coefficient of each test signal; deriving a tap coefficient of a calibration filter of a calibration filter unit according to the equivalent frequency respond corresponding to each test signal; and utilizing the calibration filter unit to calibrate an image interference caused by mismatches of the first signal path and the second signal path of the receiver in the specific frequency band for a received signal.

In accordance with an embodiment of the present invention, an exemplary calibration method for calibrating mismatches of a first signal path and a second signal path of a transmitter, wherein one of the first signal path and the second signal path is an in-phase signal path and the other one of the first signal path and the second signal path is a quadrature signal path is disclosed. The calibration method comprises: utilizing the transmitter to receive at least a test signal via the first signal path and the second signal path, wherein each test signal possesses a specific frequency within a specific frequency band; calculating at least a calibration coefficient for each test signal respectively, so as to calibrate the mismatches between the first signal path and the second signal path of the transmitter with respect to the specific frequency corresponding to each test signal; deriving an equivalent frequency respond corresponding to each test signal according to the at least a calibration coefficient of each test signal; deriving a tap coefficient of a calibration filter of a calibration filter unit according to the equivalent frequency respond corresponding to each test signal; and utilizing the calibration filter unit to calibrate an image interference caused by mismatches of the first signal path and the second signal path of the transmitter in the specific frequency band for a transmitted signal.

In accordance with an embodiment of the present invention, an exemplary calibration apparatus for calibrating mismatches of a first signal path and a second signal path of a receiver, wherein one of the first signal path and the second signal path is an in-phase signal path and the other one of the first signal path and the second signal path is a quadrature signal path is disclosed. The calibration apparatus comprises: a single frequency calibration coefficient calculating unit, a single frequency calibration coefficient calculating unit, a calibration coefficient converting unit, a spectrum analyzing unit, and a calibration filter unit. The single frequency calibration coefficient calculating unit is utilized for respectively calculating at least a calibration coefficient for each test signal of at least a test signal via the first signal path and the second signal path so as to calibrate the mismatches between the first signal path and the second signal path of the receiver with respect to the specific frequency corresponding to each test signal, wherein each test signal possesses a specific frequency within a specific frequency band. The calibration coefficient converting unit is utilized for deriving an equivalent frequency respond corresponding to each test signal according to the at least a calibration coefficient of each test signal. The spectrum analyzing unit is utilized for deriving a tap coefficient of a calibration filter of a calibration filter unit according to the equivalent frequency respond corresponding to each test signal, and the calibration filter unit is utilized for calibrating an image interference caused by mismatches of the first signal path and the second signal path of the receiver in the specific frequency band for a received signal.

In accordance with an embodiment of the present invention, an exemplary calibration apparatus for calibrating mismatches of a first signal path and a second signal path of a transmitter, wherein one of the first signal path and the second signal path is an in-phase signal path and the other one of the first signal path and the second signal path is a quadrature signal path is disclosed. The calibration apparatus comprises: a single frequency calibration coefficient calculating unit, a single frequency calibration coefficient calculating unit, a calibration coefficient converting unit, a spectrum analyzing unit, and a calibration filter unit. The single frequency calibration coefficient calculating unit is utilized for respectively calculating at least a calibration coefficient for each test signal of at least a test signal via the first signal path and the second signal path so as to calibrate the mismatches between the first signal path and the second signal path of the transmitter with respect to the specific frequency corresponding to each test signal, wherein each test signal possesses a specific frequency within a specific frequency band. The calibration coefficient converting unit is utilized for deriving an equivalent frequency respond corresponding to each test signal according to the at least a calibration coefficient of each test signal. The spectrum analyzing unit is utilized for deriving a tap coefficient of a calibration filter of a calibration filter unit according to the equivalent frequency respond corresponding to each test signal, and the calibration filter unit is utilized for calibrating an image interference caused by mismatches of the first signal path and the second signal path of the transmitter in the specific frequency band for a transmitted signal.

Briefly summarized, the calibration apparatus and the calibration method disclosed by the present invention are capable of compensating the mismatches of an in-phase (I) signal path and a quadrature (Q) signal path of a transmitter/receiver, and more particularly, the calibration apparatus and the calibration method disclosed by the present invention are capable of compensating the mismatches between the mixers in the I signal path and the Q signal path of the transmitter/receiver, and the mismatches between the low pass filters in the I signal path and the Q signal path of the transmitter/receiver. After the mismatches between the I signal path and the Q signal path are compensated/calibrated properly, the electronic device can have a better communication efficiency.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 2:
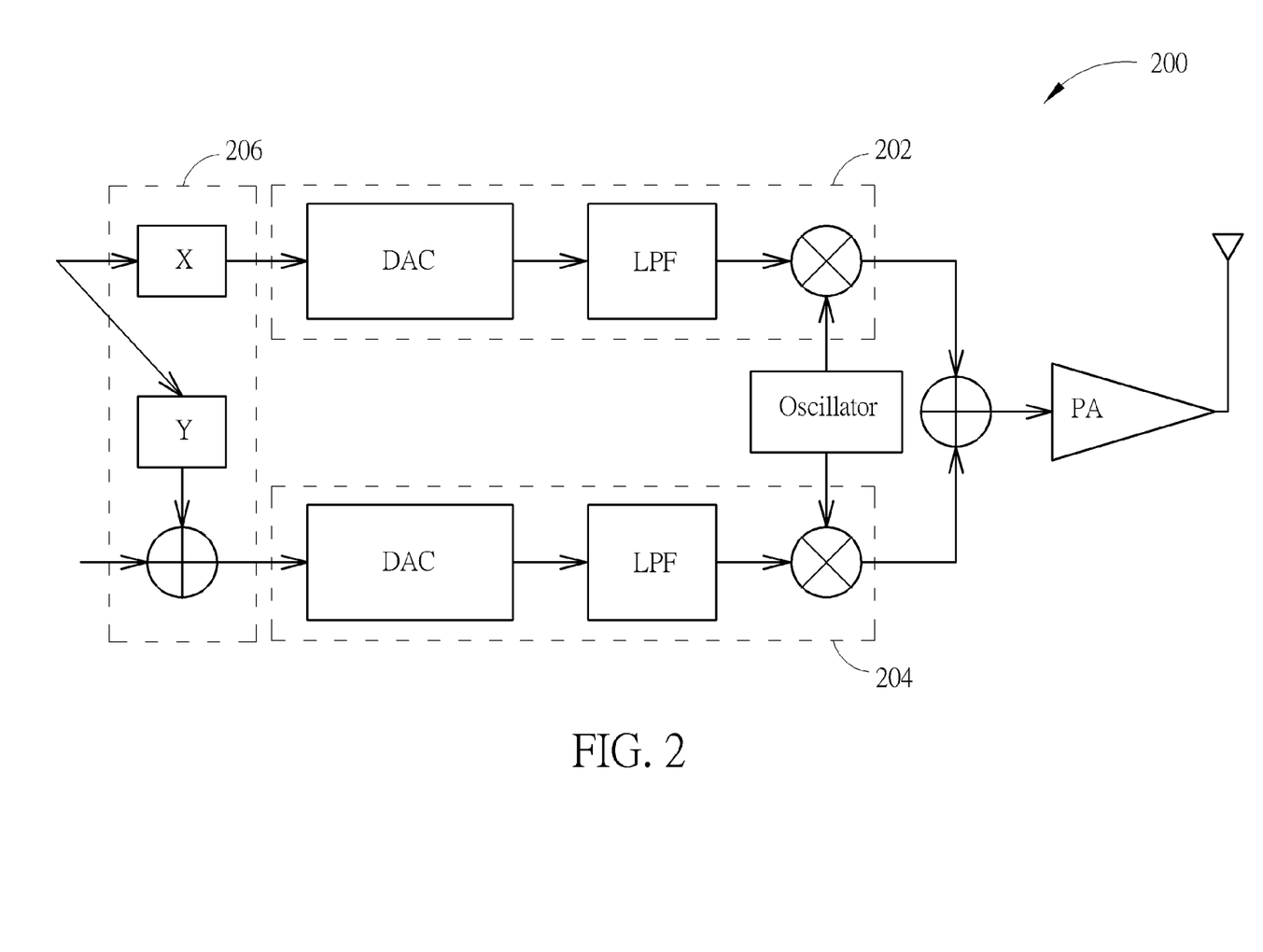
FIG. 2 is a block diagram illustrating a transmitter of a direct lifting frequency conversion transceiver.

About the calibration apparatus the present invention, the basic theory of it will be explained in math first. Please refer to FIG. 2. FIG. 2 is a block diagram illustrating a transmitter 200 of a direct lifting frequency conversion transceiver. In general, in order to test whether mismatches exist in an in-phase (I) signal path 202 and a quadrature (Q) signal path 204 of a transmitter 200, it is practical to input a single-tone signal to the transmitter 200 and via the transmitter 200, and then observe whether an image signal generated in the output terminal signal. When the generated image signal has higher level, it means a higher mismatch level between the in-phase (I) signal path 202 and the quadrature (Q) signal path 204. The transmitter 200 comprises a calibration coefficient unit 206 having two calibration coefficients that are a first calibration coefficient X and a second calibration coefficient Y, respectively. As shown in FIG. 2, the first calibration coefficient X is utilized for calibrating the amplitude mismatch level between the in-phase (I) signal path 202 and the quadrature (Q) signal path 204, and the second calibration coefficient Y is utilized for calibrating the phase mismatch level between the in-phase (I) signal path 202 and the quadrature (Q) signal path 204. It is practical to eliminate the image signal by changing the first calibration coefficient X and the second calibration coefficient Y in the calibration coefficient unit 206. In theory, if the image signal is required to be completely eliminated, the following formulas have to be satisfied:

$$X=1/R \cos(\Phi) \quad (1)$$

$$Y=-\tan(\Phi) \quad (2)$$

$\Phi$ represents a phase difference generated by a single frequency test signal having frequency of fs passing the mismatch level between the in-phase (I) signal path 202 and the quadrature (Q) signal path 204, and R represents a amplitude difference ratio generated by the single frequency test signal having frequency of fs passing the mismatch level between the in-phase (I) signal path 202 and the quadrature (Q) signal path 204.

Figure 3:
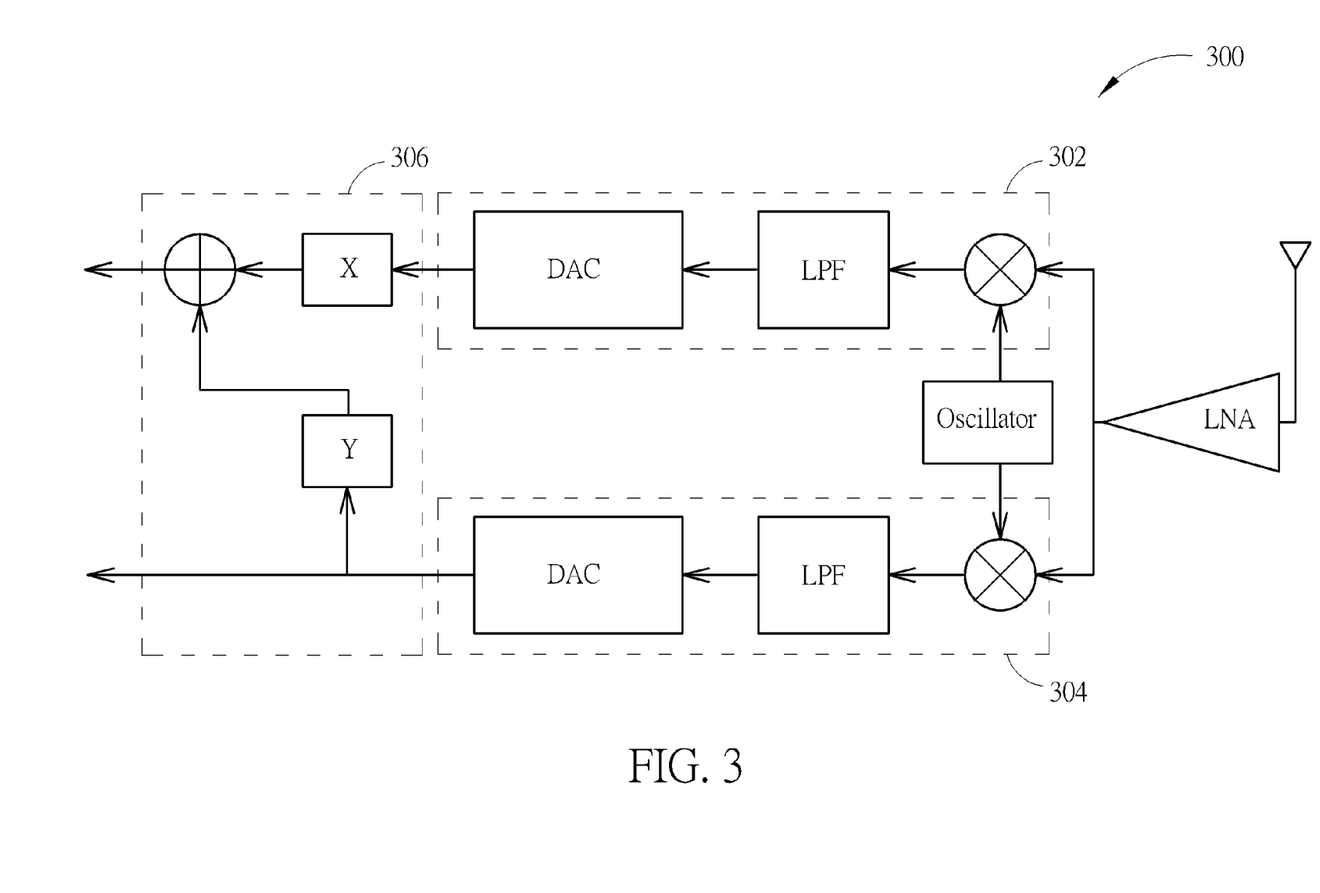
FIG. 3 is a block diagram illustrating a receiver of a direct lifting frequency conversion transceiver.

Besides, please refer to FIG. 3. FIG. 3 is a block diagram illustrating a receiver 300 of a direct lifting frequency conversion transceiver. In general, in order to test whether mismatches exist in an in-phase (I) signal path 302 and a quadrature (Q) signal path 304 of a receiver 300, it is practical to input a single-tone signal to the transmitter 300 and via the transmitter 300, and then analyze whether an image signal generated in the input terminal signal. When the generated image signal has higher level, it means a higher mismatch level between the in-phase (I) signal path 302 and the quadrature (Q) signal path 304. The transmitter 300 comprises a calibration coefficient unit 306 having two calibration coefficients that are a first calibration coefficient X and a second calibration coefficient Y, respectively. Similarly, the image signal can be completely eliminated when $X=1/R \cos(\Phi)$ and $Y=-\tan(\Phi)$, wherein $\Phi$ represents a phase difference generated by a single frequency test signal having frequency of fs passing the mismatch level between the in-phase (I) signal path 302 and the quadrature (Q) signal path 304, and R represents a amplitude difference ratio generated by the single frequency test signal having frequency of fs passing the mismatch level between the in-phase (I) signal path 302 and the quadrature (Q) signal path 304.

Figure 4:
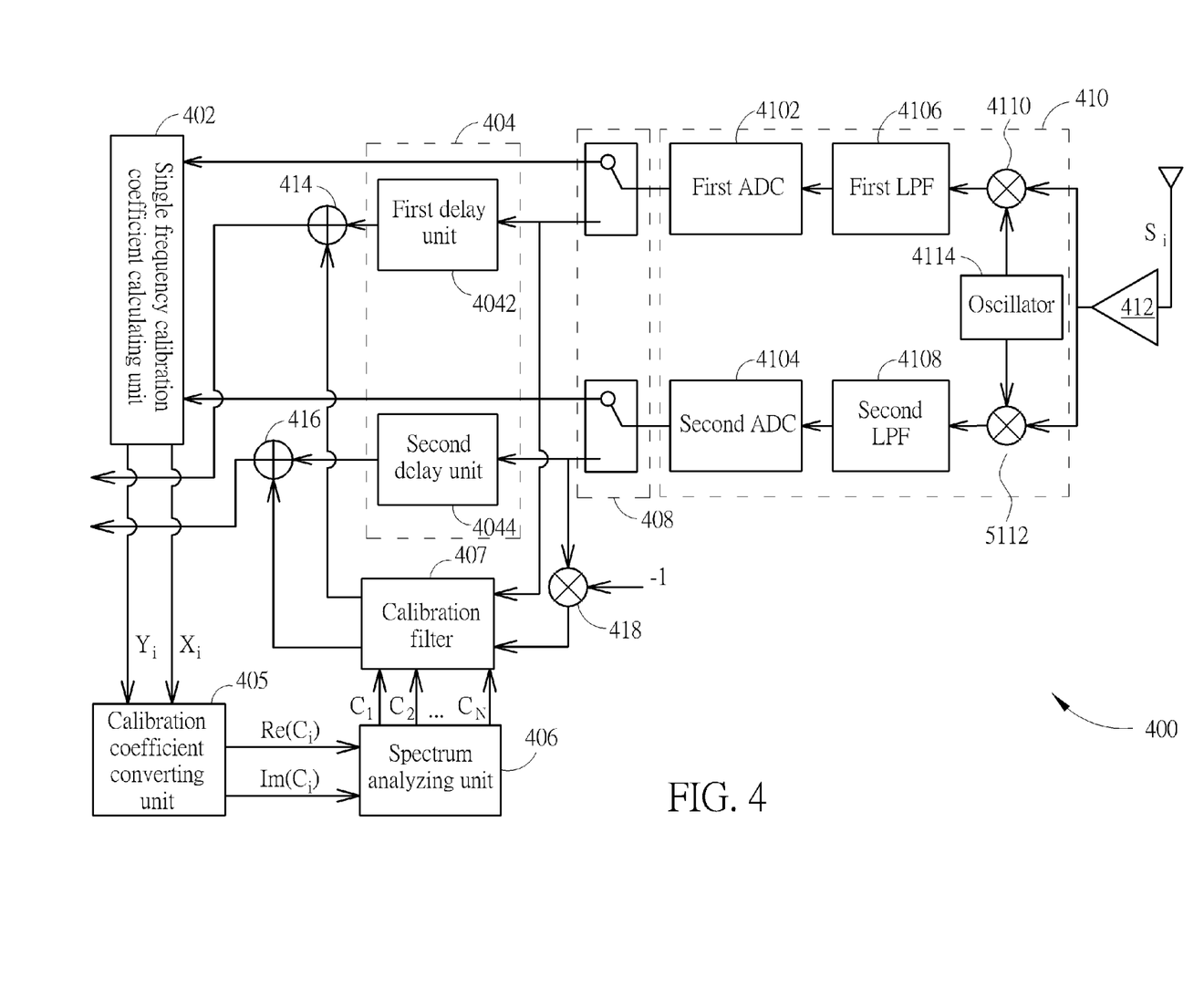
FIG. 4 is a block diagram of a calibration apparatus for calibrating mismatches of a first signal path and a second signal path of a receiver in accordance with an embodiment of the present invention.

Next, the apparatus of the present invention and related illustration will be descripted in detail in the following paragraph. Please refer to FIG. 4. FIG. 4 is a block diagram of a calibration apparatus for calibrating mismatches of a first signal path and a second signal path of a receiver 400 in accordance with an embodiment of the present invention, wherein one of the first signal path and the second signal path is an in-phase signal path (I) and the other one of the first signal path and the second signal path is a quadrature signal path (Q). The receiver 400 comprises at least a part of (such as a part of or all of) an electronic device, and the electronic device comprises at least a transmitting circuit and at least a receiving circuit, wherein the example of the electronic device can comprise (but not be limited to) a multi-functional cellphone, a smartphone, a Personal Digital Assistant, a Personal Computer such as a Laptop Computer or a Desktop Computer. For example, the receiver 400 can represent a processing module in the electronic device, such as a processor, or the receiver 400 can represent a whole of the electronic device. However, please note that the above embodiment is only for an illustrative purpose and is not meant to be a limitation of the present invention. In any case, various modifications and alterations of the device should fall into the disclosed scope of the present invention as long as the performances and functions disclosed by the present invention can be attained. According to a variation of the present invention, the receiver 400 can represent a system comprising the electronic device, and the electronic device is a sub-system of the system, and more particularly, the electronic device can be an electronic device comprising a Direct-Conversion circuit, wherein the receiver 400 can directly calibrate the above Direct-Conversion circuit, but it is not meant to be a limitation of the present invention.

As shown in FIG. 4, the receiver 400 comprises: a single frequency calibration coefficient calculating unit 402, a delay unit 404, a calibration coefficient converting unit 405, a spectrum analyzing unit 406, a calibration filter 407, a switch unit 408, a first analog-to-digital converter (ADC) 4102, a second ADC 4104, a first low pass filter (LPF) 4106, a second LPF 4108, a first mixer 4110, a second mixer 4112, an oscillator 4114, a low noise amplifier (LNA) 412, two adders 414, 416, and a multiplier 418. According to this embodiment, each time after the receiver 400 is restarted (such as after powered on or after the system is rebooted) and before an ordinary data transmitting mode is normally started, in order to improve the circuit characteristic mismatch between an in-phase (I) signal path (i.e. a path passing by the first ADC 4102, the first LPF 4106, and the first mixer 4110 in the receiving terminal 410) and a quadrature (Q) signal path (i.e. a path passing by the second ADC 4104, the second LPF 4108, the second mixer 4112 in the receiving terminal 410) of a receiving terminal 410 (at least comprising the first ADC 4102, the second ADC 4104, the first LPF 4106, the second LPF 4108, the first mixer 4110, the second mixer 4112, and the oscillator 4114) of the receiver 400, the receiver 400 will enter into a calibration coefficient calculating mode. In other words, in the calibration coefficient calculating mode, the first step is to perform an optimal calibration coefficient calculation for the mismatch between the in-phase (I) signal path and the quadrature (Q) signal path in the receiving terminal 410 of the receiver 400, and use the calibration coefficient obtained in the calibration coefficient calculating mode to perform a normal data receiving operation. However, please note that the above embodiment is only for an illustrative purpose and is not meant to be a limitation of the present invention. In any case, various modifications and alterations of the device should fall into the disclosed scope of the present invention as long as the performances and functions disclosed by the present invention can be attained. For example, the first LPF 4106 and the second LPF 4108 also can be filters with other functions.

Specifically, the calibration point of this embodiment is to further add the single frequency calibration coefficient calculating unit 402, the delay unit 404 (comprising a first delay unit 4042 and a second delay unit 4044), the calibration coefficient converting unit 405, the spectrum analyzing unit 406, and the calibration filter 407 in the receiving terminal 410 of the receiver 400, wherein the single frequency calibration coefficient calculating unit 402 is utilized for respectively calculating a first calibration coefficient X and a second calibration coefficient Y for at least a specific frequency within a specific frequency band, and the calibration coefficient converting unit 405 and the spectrum analyzing unit 406 will convert the first calibration coefficient X and the second calibration coefficient Y of the at least a specific frequency calculated by the single frequency calibration coefficient calculating unit 402 to at least a filter tap coefficient in the calibration filter 407. The calibration filter 407 is directly or indirectly coupled to the receiving terminal 410 of the receiver 400 to perform the calibration for an output of the receiving terminal 410 in the specific frequency band range. However, please note that the above embodiment about the single frequency calibration coefficient calculating unit 402 is only for an illustrative purpose and is not meant to be a limitation of the present invention. It is also practical to use over two calibration coefficients, but the corresponding complexity and accuracy also might have variations. The determining method and details of the tap coefficient in the calibration filter 407 will be described in detail in the following paragraphs.

This embodiment is utilized for calibrating the above IQ mismatches in the specific frequency band range of the receiving terminal 410. As shown in FIG. 4, the operation of the related circuit is: after a received signal is received and conjugated, make the received signal pass by the calibration filter 407 and add with the received signal delayed by the delay unit 404. Conjugating the received signal is for generating an image signal of the received signal, and the image signal is adjusted by passing by the calibration filter 407. Add the adjusted image signal with the received signal can eliminate the image signal interference caused by the IQ mismatches of the receiving terminal 410 in the specific frequency band range. The function of the delay unit 404 is to make the received signal and the signal outputted by the calibration filter 407 be synchronized. The single frequency calibration coefficient calculating unit 402, the calibration coefficient converting unit 405 and the spectrum analyzing unit 406 calculate the at least a tap coefficient of the calibration filter 407 according to the received signal in the calibration coefficient calculating mode (such as the setting of the switch unit 408). Specifically, since the IQ mismatches of the receiving terminal 410 at different frequency in the specific frequency band might be different, different image signals will be generated accordingly. Thus, in the calibration coefficient calculating mode, a plurality of single frequency test signals $S_i$ with the frequency $f_i$, respectively, wherein i=1~N, and N is a positive integer larger than 1 (such as N=6), and N can be determined according to actual requirements or hardware concern, and the image signal compensation for the specific frequency band is more accurate when N is larger. Firstly, the single frequency test signals $S_1$~$S_N$ will be received, respectively, and the corresponding first calibration coefficient $X_i$ and the corresponding second calibration coefficient $Y_i$ will be found, respectively. That is, find the first calibration coefficient $X_i$ and the second calibration coefficient $Y_i$ capable of calibrating the image signal interference caused by the IQ mismatches under the frequency $f_1$~$f_N$, and the method thereof is not limited in the present invention.

Next, the calibration coefficient converting unit 405 is utilized for converting the first calibration coefficient $X_i$ and the second calibration coefficient $Y_i$ to an equivalent frequency respond $C_i$, wherein $C_i$ is in complex number form. Please refer to FIG. 3 together and the output of the single frequency calibration coefficient calculating unit 402 is obtained:

$$\cos(wt) + Y\sin(wt) + j\sin(wt) = \quad (3)$$

$$e^{jwt} + (X-1)\frac{e^{jwt} + e^{-jwt}}{2} - jY\frac{e^{jwt} + e^{-jwt}}{2} =$$

$$\frac{X - jY + 1}{2}\left(e^{jwt} + \frac{X + jY - 1}{X - jY + 1}e^{-jwt}\right)$$

$$C_i = \frac{X_i + jY_i - 1}{X_i - jY_i + 1} = \frac{X_i^2 - Y_i^2 - 1 + j2X_iY_i}{X_i^2 + Y_i^2 + 2X_i + 1} \quad (4)$$

Finally, the spectrum analyzing unit 406 is utilized for performing a discrete N points of Fourier transform (DFT) for the equivalent frequency respond $C_i$~$C_N$, so as to obtain N tap coefficients $c_i$~$c_n$ of the the calibration filter 407.

Figure 5:
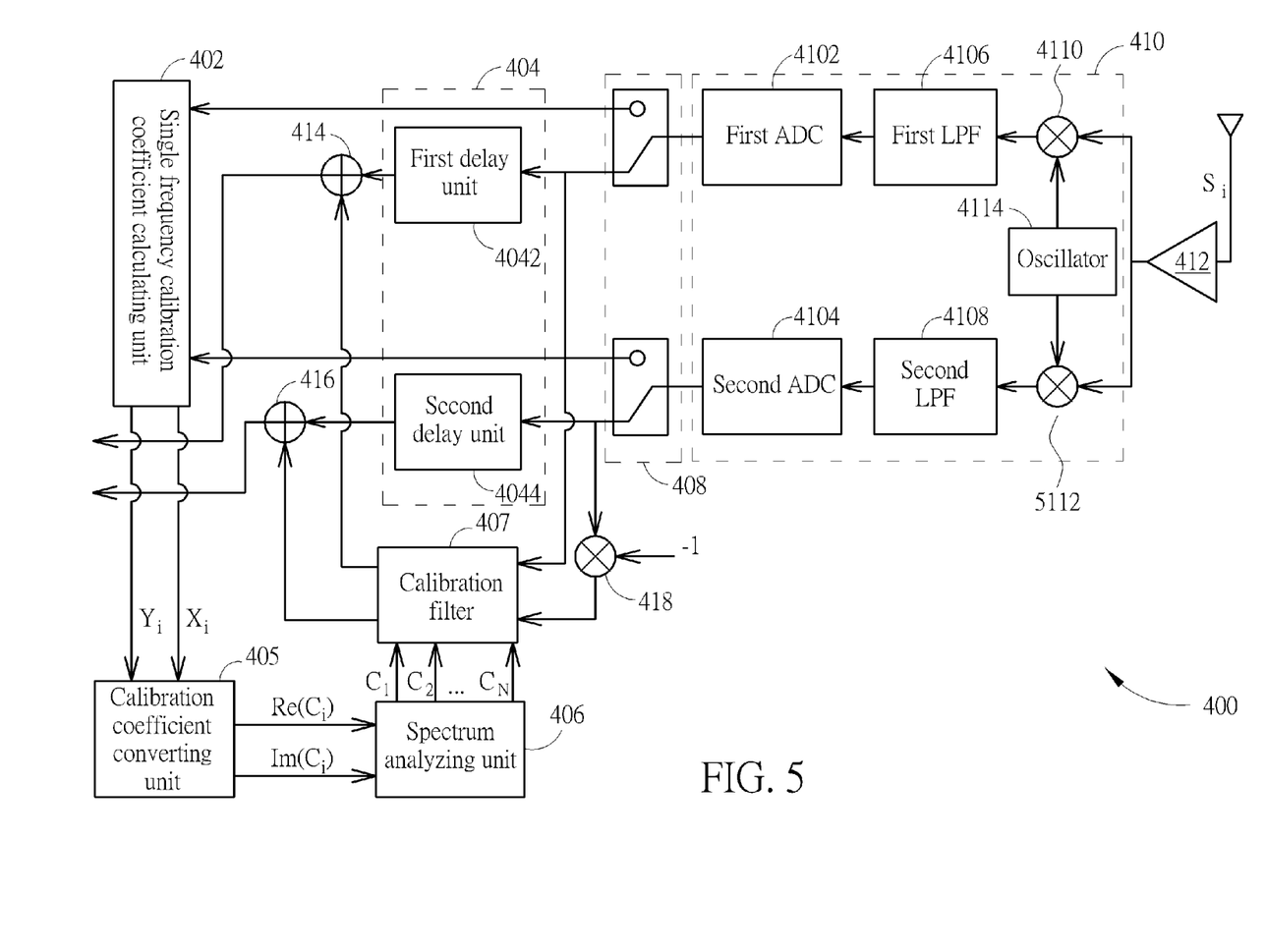
FIG. 5 is a block diagram of another setting of the calibration apparatus in FIG. 4.
Figure 6:
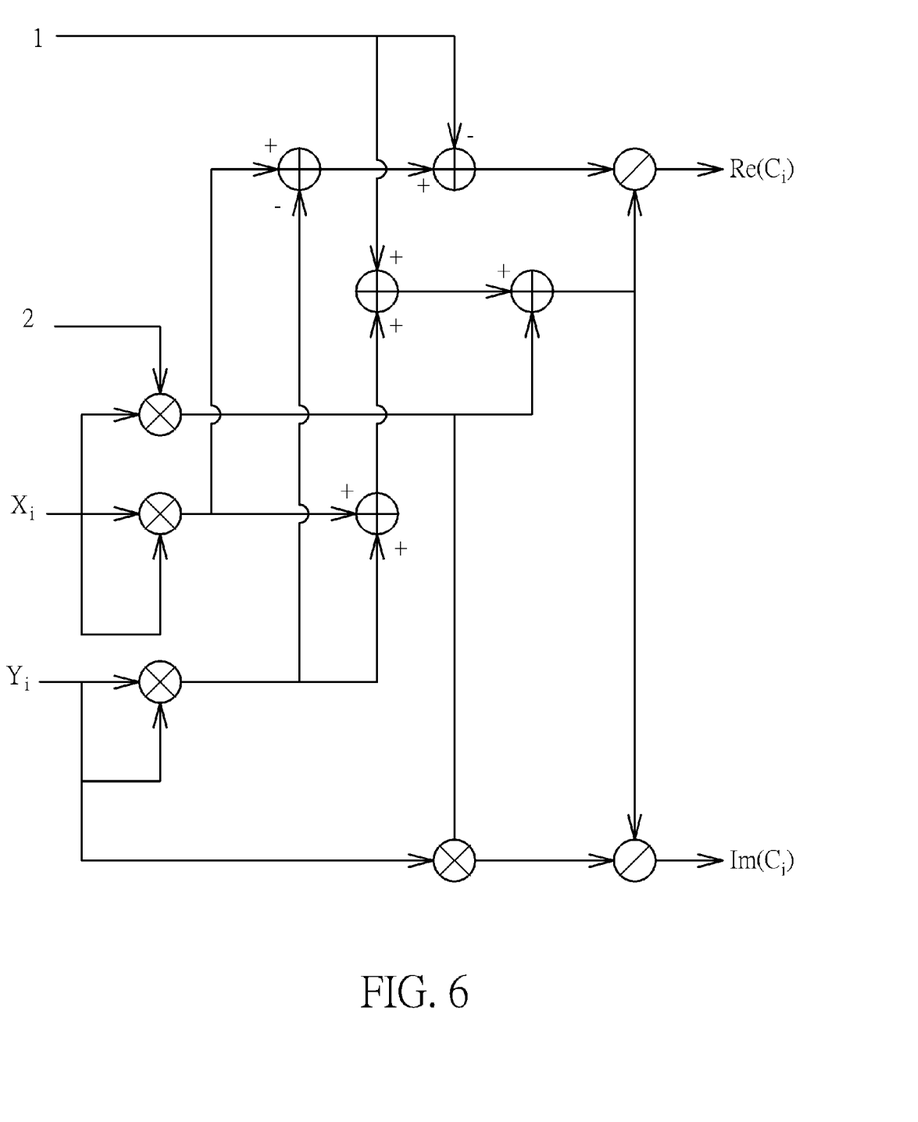
FIG. 6 is a diagram of a calibration coefficient converting unit in accordance with an embodiment of the present invention.

FIG. 5 is a block diagram of another setting of the calibration apparatus 400 in FIG. 4. After utilizing the single frequency calibration coefficient calculating unit 402, the calibration coefficient converting unit 405, and the spectrum analyzing unit 406 to calculate N tap coefficients $c_i$~$c_n$ of the the calibration filter 407, the setting of the calibration apparatus 400 can be changed from the calibration coefficient calculating mode in FIG. 4 to a normal data transmitting mode in FIG. 5 (such as the setting of the switch unit 408 in FIG. 5). FIG. 6 is a diagram of a calibration coefficient converting unit in accordance with an embodiment of the present invention, showing a circuit architecture of the calibration coefficient converting unit 405 according to the formula (4).

Figure 7:
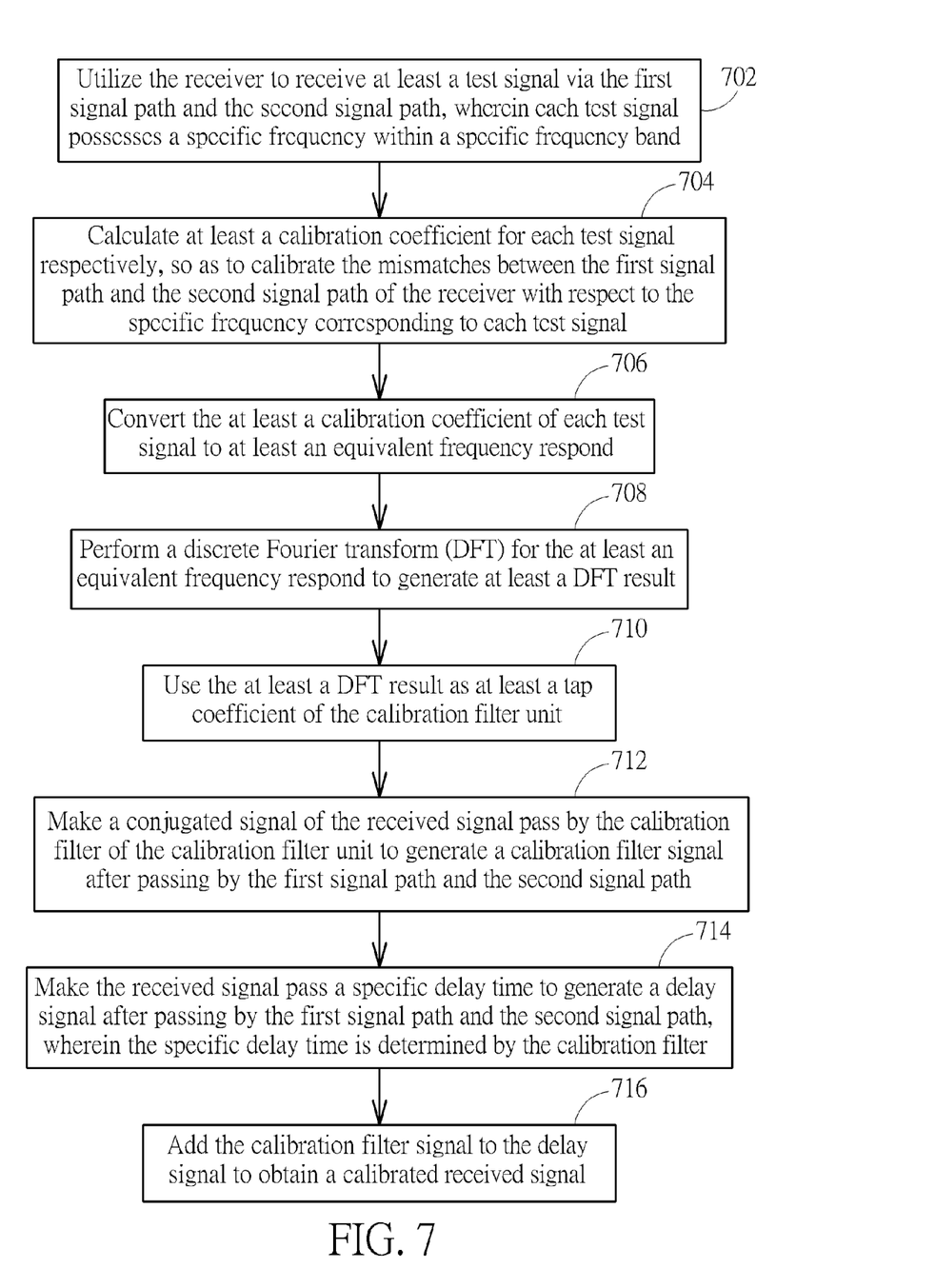
FIG. 7 shows a first exemplary flowchart of an exemplary calibration method for calibrating mismatches of a first signal path and a second signal path of a receiver.

Please refer to FIG. 7. FIG. 7 shows a first exemplary flowchart of an exemplary calibration method for calibrating mismatches of a first signal path and a second signal path of a receiver, wherein one of the first signal path and the second signal path is an in-phase signal path (I) and the other one of the first signal path and the second signal path is a quadrature signal path (Q). Provided that substantially the same result is achieved, the steps of the process flowchart do not have to be in the exact order shown in FIG. 7 and need not be contiguous, meaning that other steps can be intermediate. The calibration method in FIG. 7 can be applied to the receiver 400 in FIG. 4 and FIG. 5. The calibration method comprises the following steps:

Step 702: Utilize the receiver to receive at least a test signal via the first signal path and the second signal path, wherein each test signal possesses a specific frequency within a specific frequency band.

Step 704: Calculate at least a calibration coefficient for each test signal respectively, so as to calibrate the mismatches between the first signal path and the second signal path of the receiver with respect to the specific frequency corresponding to each test signal.

Step 706: Convert the at least a calibration coefficient of each test signal to at least an equivalent frequency respond.

Step 708: Perform a discrete Fourier transform (DFT) for the at least an equivalent frequency respond to generate at least a DFT result.

Step 710: Use the at least a DFT result as at least a tap coefficient of the calibration filter unit.

Step 712: Make a conjugated signal of the received signal pass by the calibration filter of the calibration filter unit to generate a calibration filter signal after passing by the first signal path and the second signal path.

Step 714: Make the received signal pass a specific delay time to generate a delay signal after passing by the first signal path and the second signal path, wherein the specific delay time is determined by the calibration filter.

Step 716: Add the calibration filter signal to the delay signal to obtain a calibrated received signal.

After the calibration flowchart of the Step 702 to the Step 716, an optimal tap coefficient of the calibration filter 407 can be obtained directly and accurately. Besides, the present invention minimizes the corresponding image signals caused by the specific frequency range, and thus all the image signals of the receiving terminal 410 in the specific frequency range can be minimized. In other words, the compensation in this embodiment is performed for any appointed frequency.

Figure 8:
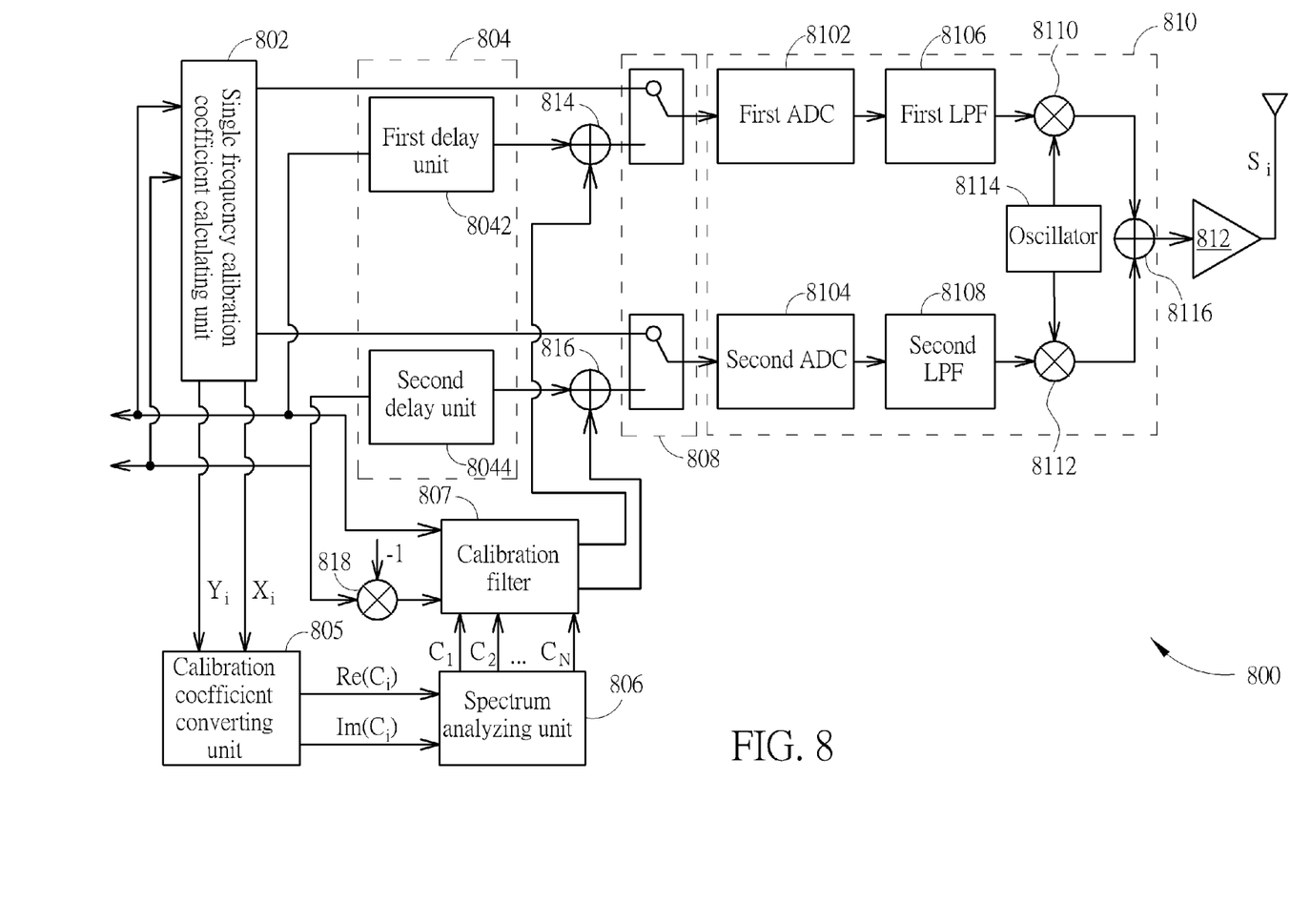
FIG. 8 is a block diagram of a calibration apparatus for calibrating mismatches of a first signal path and a second signal path of a transmitter in accordance with an embodiment of the present invention.

Please refer to FIG. 8. FIG. 8 is a block diagram of a calibration apparatus for calibrating mismatches of a first signal path and a second signal path of a transmitter 800 in accordance with an embodiment of the present invention, wherein one of the first signal path and the second signal path is an in-phase signal path (I) and the other one of the first signal path and the second signal path is a quadrature signal path (Q). The transmitter 800 comprises at least a part of (such as a part of or all of) an electronic device, and the electronic device comprises at least a transmitting circuit and at least a transmitting circuit, wherein the example of the electronic device can comprise (but not be limited to) a multi-functional cellphone, a smartphone, a Personal Digital Assistant, a Personal Computer such as a Laptop Computer or a Desktop Computer. For example, the transmitter 800 can represent a processing module in the electronic device, such as a processor, or the transmitter 800 can represent a whole of the electronic device. However, please note that the above embodiment is only for an illustrative purpose and is not meant to be a limitation of the present invention. In any case, various modifications and alterations of the device should fall into the disclosed scope of the present invention as long as the performances and functions disclosed by the present invention can be attained. According to a variation of the present invention, the transmitter 800 can represent a system comprising the electronic device, and the electronic device is a subsystem of the system, and more particularly, the electronic device can be an electronic device comprising a Direct-Conversion circuit, wherein the transmitter 800 can directly calibrate the above Direct-Conversion circuit, but it is not meant to be a limitation of the present invention.

As shown in FIG. 8, the transmitter 800 comprises: a single frequency calibration coefficient calculating unit 802, a delay unit 804, a calibration coefficient converting unit 805, a spectrum analyzing unit 806, a calibration filter 807, a switch unit 808, a first digital-to-analog converter (DAC) 8102, a second DAC 8104, a first low pass filter (LPF) 8106, a second LPF 8108, a first mixer 8110, a second mixer 8112, an oscillator 8114, a low noise amplifier (LNA) 812, two adders 814, 816, and a multiplier 818. According to this embodiment, each time after the transmitter 800 is restarted (such as after powered on or after the system is rebooted) and before an ordinary data transmitting mode is normally started, in order to improve the circuit characteristic mismatch between an in-phase (I) signal path (i.e. a path passing by the first DAC 8102, the first LPF 8106, and the first mixer 8110 in the transmitting terminal 810) and a quadrature (Q) signal path (i.e. a path passing by the second DAC 8104, the second LPF 8108, the second mixer 8112 in the transmitting terminal 810) of a transmitting terminal 810 (at least comprising the first DAC 8102, the second DAC 8104, the first LPF 8106, the second LPF 8108, the first mixer 8110, the second mixer 8112, and the oscillator 8114) of the transmitter 800, the transmitter 800 will enter into a calibration coefficient calculating mode. In other words, in the calibration coefficient calculating mode, the first step is to perform an optimal calibration coefficient calculation for the mismatch between the in-phase (I) signal path and the quadrature (Q) signal path in the transmitting terminal 810 of the transmitter 800, and use the calibration coefficient obtained in the calibration coefficient calculating mode to perform a normal data transmitting operation. However, please note that the above embodiment is only for an illustrative purpose and is not meant to be a limitation of the present invention. In any case, various modifications and alterations of the device should fall into the disclosed scope of the present invention as long as the performances and functions disclosed by the present invention can be attained. For example, the first LPF 8106 and the second LPF 8108 also can be filters with other functions.

Specifically, the calibration point of this embodiment is to further add the single frequency calibration coefficient calculating unit 802, the delay unit 804 (comprising a first delay unit 8042 and a second delay unit 8048), the calibration coefficient converting unit 805, the spectrum analyzing unit 806, and the calibration filter 807 in the transmitting terminal 810 of the transmitter 800, wherein the single frequency calibration coefficient calculating unit 802 is utilized for respectively calculating a first calibration coefficient X and a second calibration coefficient Y for at least a specific frequency within a specific frequency band, and the calibration coefficient converting unit 805 and the spectrum analyzing unit 806 will convert the first calibration coefficient X and the second calibration coefficient Y of the at least a specific frequency calculated by the single frequency calibration coefficient calculating unit 802 to at least a filter tap coefficient in the calibration filter 807. The calibration filter 807 is directly or indirectly coupled to the transmitting terminal 810 of the transmitter 800 to perform the calibration for an output of the transmitting terminal 810 in the specific frequency band range. However, please note that the above embodiment about the single frequency calibration coefficient calculating unit 802 is only for an illustrative purpose and is not meant to be a limitation of the present invention. It is also practical to use over two calibration coefficients, but the corresponding complexity and accuracy also might have variations. The determining method and details of the tap coefficient in the calibration filter 807 will be described in detail in the following paragraphs.

This embodiment is utilized for calibrating the above IQ mismatches in the specific frequency band range of the transmitting terminal 810. As shown in FIG. 8, the operation of the related circuit is: after a transmitting signal about to be transmitted is transmitted and conjugated, make the transmitted signal pass by the calibration filter 807 and add with the transmitted signal delayed by the delay unit 804. Conjugating the transmitting signal about to be transmitted is for generating an image signal of the transmitted signal, and the image signal is adjusted by passing by the calibration filter 807. Add the adjusted image signal with the transmitted signal can eliminate the image signal interference caused by the IQ mismatches of the transmitting terminal 810 in the specific frequency band range. The function of the delay unit 804 is to make the transmitted signal and the signal outputted by the calibration filter 807 be synchronized. The single frequency calibration coefficient calculating unit 802, the calibration coefficient converting unit 805 and the spectrum analyzing unit 806 calculate the at least a tap coefficient of the calibration filter 807 according to the transmitted signal in the calibration coefficient calculating mode (such as the setting of the switch unit 808). Specifically, since the IQ mismatches of the transmitting terminal 810 at different frequency in the specific frequency band might be different, different image signals will be generated accordingly. Thus, in the calibration coefficient calculating mode, a plurality of single frequency test signals $S_i$ with the frequency $f_i$, respectively, wherein i=1~N, and N is a positive integer larger than 1 (such as N=6), and N can be determined according to actual requirements or hardware concern, and the image signal compensation for the specific frequency band is more accurate when N is larger. Firstly, the single frequency test signals $S_1 \sim S_N$ will be transmitted from the base frequency, respectively, and the corresponding first calibration coefficient $X_i$ and the corresponding second calibration coefficient $Y_i$ will be found, respectively. That is, find the first calibration coefficient $X_i$ and the second calibration coefficient $Y_i$ capable of calibrating the image signal interference caused by the IQ mismatches under the frequency $f_1 \sim f_N$, and the method thereof is not limited in the present invention.

Next, the calibration coefficient converting unit 805 is utilized for converting the first calibration coefficient $X_i$ and the second calibration coefficient $Y_i$ to an equivalent frequency respond $C_i$, wherein $C_i$ is in complex number form. Please refer to FIG. 3 together and the output of the single frequency calibration coefficient calculating unit 802 is obtained:

$$X\cos(wt) + j\sin(wt) + jY\cos(wt) = \qquad (5)$$

$$e^{jwt} + (X-1)\frac{e^{jwt} + e^{-jwt}}{2} + jY\frac{e^{jwt} + e^{-jwt}}{2} =$$

$$\frac{X+jY+1}{2}\left(e^{jwt} + \frac{X+jY-1}{X+jY+1}e^{-jwt}\right)$$

$$C_i = \frac{X_i + jY_i - 1}{X_i + jY_i + 1} = \frac{X_i^2 + Y_i^2 - j2Y_i - 1}{X_i^2 + Y_i^2 + 2X_i + 1} \qquad (6)$$

Finally, the spectrum analyzing unit 806 is utilized for performing a discrete N points of Fourier transform (DFT) for the equivalent frequency respond $C_i \sim C_N$, so as to obtain N tap coefficients $c_i \sim c_n$ of the the calibration filter 807.

Figure 9:
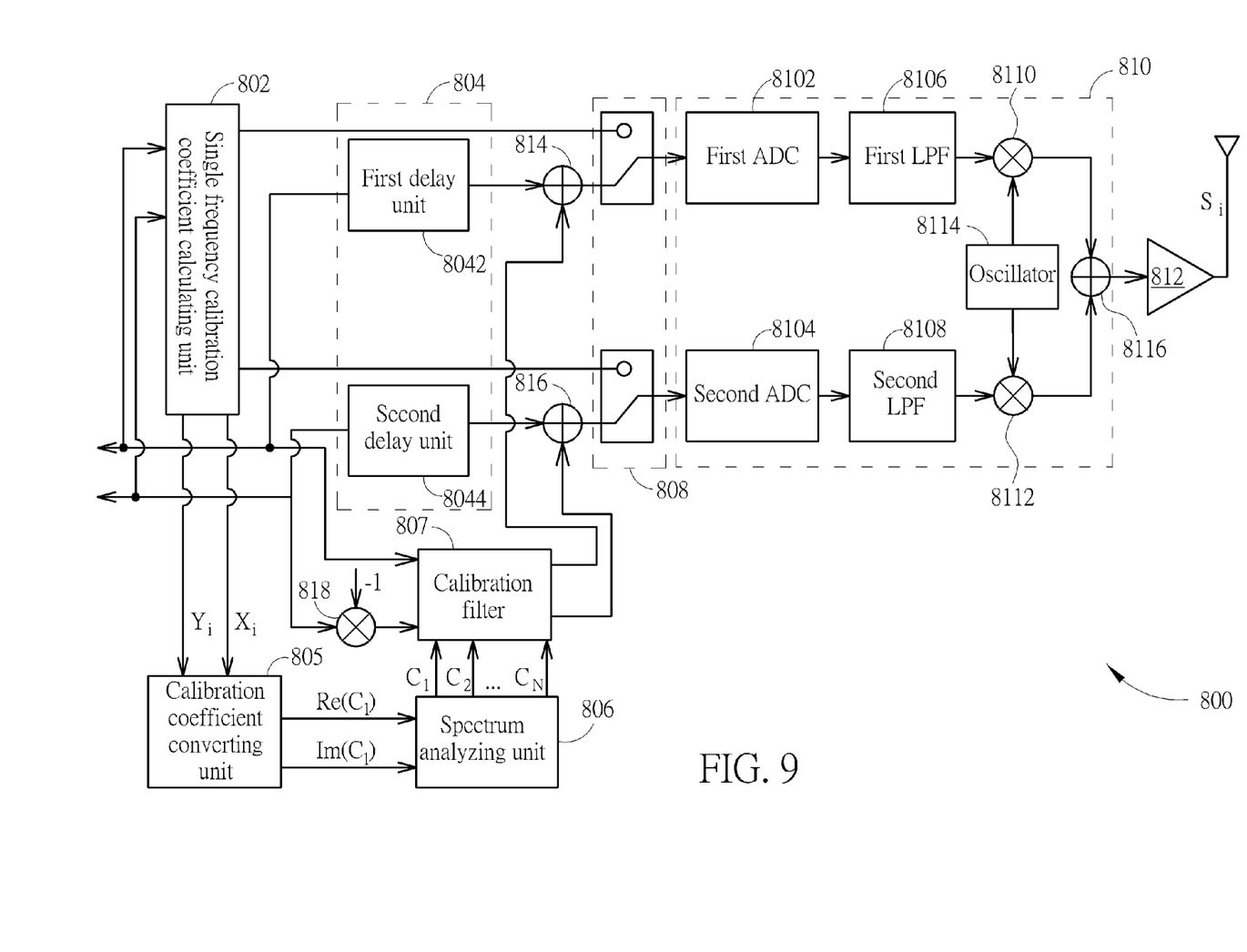
FIG. 9 is a block diagram of another setting of the calibration apparatus in FIG. 8.
Figure 10:
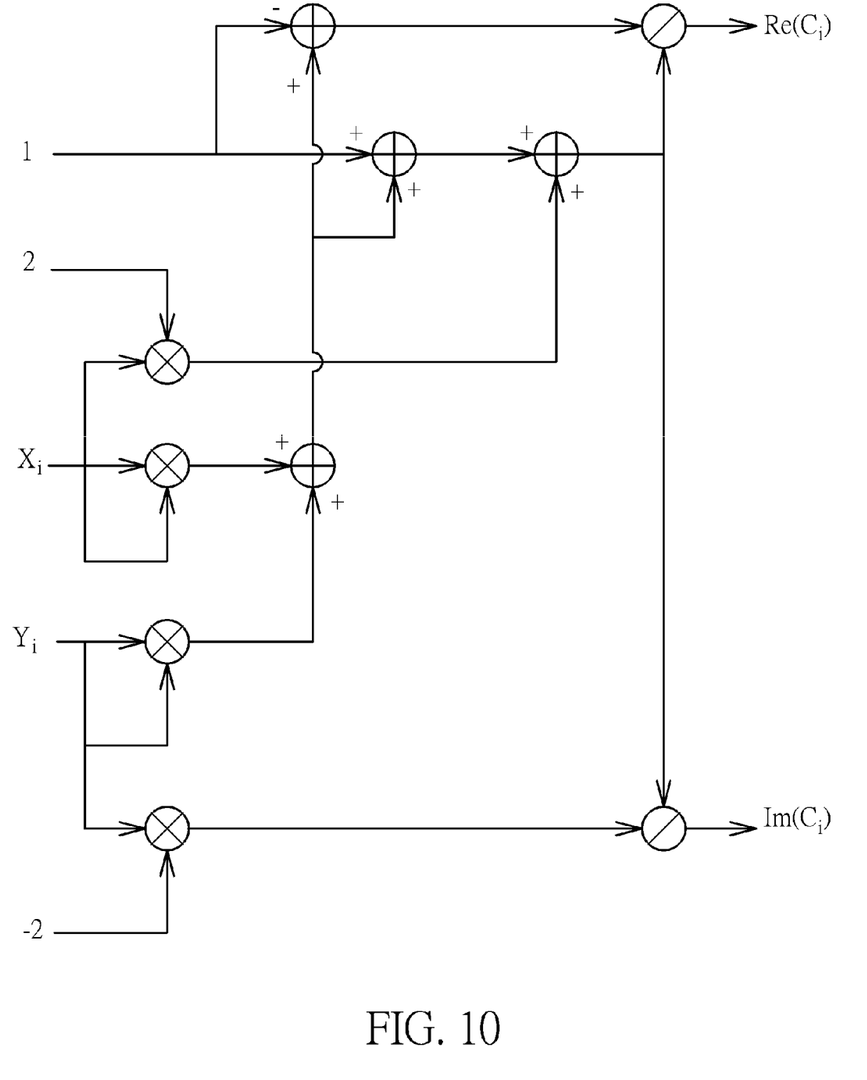
FIG. 10 is a diagram of a calibration coefficient converting unit in accordance with an embodiment of the present invention.

FIG. 9 is a block diagram of another setting of the calibration apparatus 800 in FIG. 8. After utilizing the single frequency calibration coefficient calculating unit 802, the calibration coefficient converting unit 805, and the spectrum analyzing unit 806 to calculate N tap coefficients $c_i \sim c_n$ of the the calibration filter 807, the setting of the calibration apparatus 800 can be changed from the calibration coefficient calculating mode in FIG. 8 to a normal data transmitting mode in FIG. 9 (such as the setting of the switch unit 808 in FIG. 9). FIG. 10 is a diagram of a calibration coefficient converting unit in accordance with an embodiment of the present invention, showing a circuit architecture of the calibration coefficient converting unit 805 according to the formula (6).

Figure 11:
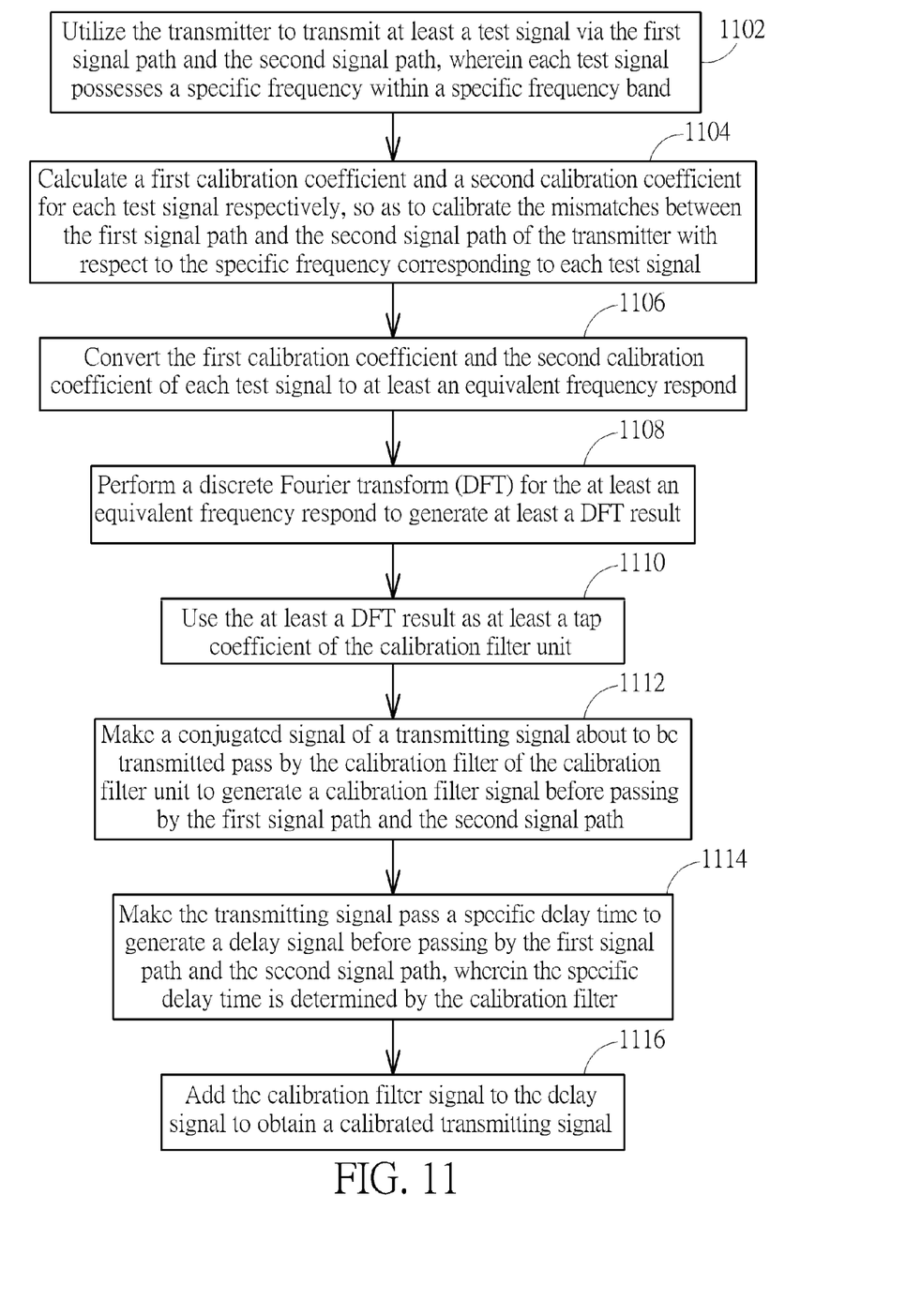
FIG. 11 shows a first exemplary flowchart of an exemplary calibration method for calibrating mismatches of a first signal path and a second signal path of a transmitter.

Please refer to FIG. 11. FIG. 11 shows a first exemplary flowchart of an exemplary calibration method for calibrating mismatches of a first signal path and a second signal path of a transmitter, wherein one of the first signal path and the second signal path is an in-phase signal path (I) and the other one of the first signal path and the second signal path is a quadrature signal path (Q). Provided that substantially the same result is achieved, the steps of the process flowchart do not have to be in the exact order shown in FIG. 11 and need not be contiguous, meaning that other steps can be intermediate. The calibration method in FIG. 11 can be applied to the transmitter 800 in FIG. 8 and FIG. 9. The calibration method comprises the following steps:

Step 1102: Utilize the transmitter to transmit at least a test signal via the first signal path and the second signal path, wherein each test signal possesses a specific frequency within a specific frequency band.

Step 1104: Calculate a first calibration coefficient and a second calibration coefficient for each test signal respectively, so as to calibrate the mismatches between the first signal path and the second signal path of the transmitter with respect to the specific frequency corresponding to each test signal.

Step 1106: Convert the first calibration coefficient and the second calibration coefficient of each test signal to at least an equivalent frequency respond.

Step 1108: Perform a discrete Fourier transform (DFT) for the at least an equivalent frequency respond to generate at least a DFT result.

Step 1110: Use the at least a DFT result as at least a tap coefficient of the calibration filter unit.

Step 1112: Make a conjugated signal of a transmitting signal about to be transmitted pass by the calibration filter of the calibration filter unit to generate a calibration filter signal before passing by the first signal path and the second signal path.

Step 1114: Make the transmitting signal pass a specific delay time to generate a delay signal before passing by the first signal path and the second signal path, wherein the specific delay time is determined by the calibration filter.

Step 1116: Add the calibration filter signal to the delay signal to obtain a calibrated transmitting signal.

After the calibration flowchart of the Step 1102 to the Step 1116, an optimal tap coefficient of the calibration filter 807 can be obtained directly and accurately. Besides, the present invention minimizes the corresponding image signals caused by the specific frequency range, and thus all the image signals of the transmitting terminal 410 in the specific frequency range can be minimized. In other words, the compensation in this embodiment is performed for any appointed frequency.

Briefly summarized, the calibration apparatus and the calibration method disclosed by the present invention are capable of compensating the mismatches of an in-phase (I) signal path and a quadrature (Q) signal path of a transmitter/receiver, and more particularly, the calibration apparatus and the calibration method disclosed by the present invention are capable of compensating the mismatches between the mixers in the I signal path and the Q signal path of the transmitter/receiver, and the mismatches between the low pass filters in the I signal path and the Q signal path of the transmitter/receiver. After the mismatches between the I signal path and the Q signal path are compensated/calibrated properly, the electronic device can have a better communication efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A calibration method for calibrating mismatches of a first signal path and a second signal path of a receiver, wherein one of the first signal path and the second signal path is an in-phase signal path and the other one of the first signal path and the second signal path is a quadrature signal path, the calibration method comprising:

utilizing the receiver to receive at least a test signal via the first signal path and the second signal path, wherein each test signal possesses a specific frequency within a specific frequency band;

calculating at least a calibration coefficient for each test signal respectively, so as to calibrate the mismatches between the first signal path and the second signal path of the receiver with respect to the specific frequency corresponding to each test signal;

deriving an equivalent frequency respond corresponding to each test signal according to the at least a calibration coefficient of each test signal;

deriving a tap coefficient of a calibration filter of a calibration filter unit according to the equivalent frequency respond corresponding to each test signal; and utilizing the calibration filter unit to calibrate an image interference caused by mismatches of the first signal path and the second signal path of the receiver in the specific frequency band for a received signal;

wherein the step of utilizing the calibration filter unit to calibrate the image interference caused by mismatches of the first signal path and the second signal path of the receiver in the specific frequency band for a received signal comprises:

making a conjugated signal of the received signal pass by the calibration filter of the calibration filter unit to generate a calibration filter signal after passing by the first signal path and the second signal path;

making the received signal pass a specific delay time to generate a delay signal after passing by the first signal path and the second signal path, wherein the specific delay time is determined by the calibration filter; and adding calibration filter signal to the delay signal to obtain a calibrated received signal.

2. The calibration method of claim 1, wherein the receiver is a Direct-Conversion Receiver.

3. The calibration method of claim 1, wherein the at least a calibration coefficient comprises a first calibration coefficient and a second calibration coefficient, wherein the first calibration coefficient is utilized for calibrating amplitude mismatches between the first signal path and the second signal path, and the second calibration coefficient is utilized for calibrating phase mismatches between the first signal path and the second signal path.

4. The calibration method of claim 1, wherein the step of deriving the tap coefficient of the calibration filter unit according to the equivalent frequency respond corresponding to each test signal comprises:

performing a discrete Fourier transform (DFT) for the equivalent frequency respond to generate a DFT result; and using the DFT result as the tap coefficient of the calibration filter unit.

5. A calibration method for calibrating mismatches of a first signal path and a second signal path of a transmitter, wherein one of the first signal path and the second signal path is an in-phase signal path and the other one of the first signal path and the second signal path is a quadrature signal path, the calibration method comprising:

utilizing the transmitter to receive at least a test signal via the first signal path and the second signal path, wherein each test signal possesses a specific frequency within a specific frequency band;

calculating at least a calibration coefficient for each test signal respectively, so as to calibrate the mismatches between the first signal path and the second signal path of the transmitter with respect to the specific frequency corresponding to each test signal;

deriving an equivalent frequency respond corresponding to each test signal according to the at least a calibration coefficient of each test signal;

deriving a tap coefficient of a calibration filter of a calibration filter unit according to the equivalent frequency respond corresponding to each test signal; and utilizing the calibration filter unit to calibrate an image interference caused by mismatches of the first signal path and the second signal path of the transmitter in the specific frequency band for a transmitting signal about to be transmitted;

wherein the step of utilizing the calibration filter unit to calibrate the image interference caused by mismatches of the first signal path and the second signal path of the transmitter in the specific frequency band for a transmitted signal comprises:

making a conjugated signal of the transmitting signal about to be transmitted pass by the calibration filter of the calibration filter unit to generate a calibration filter signal after passing by the first signal path and the second signal path;

making the transmitting signal pass a specific delay time to generate a delay signal after passing by the first signal path and the second signal path, wherein the specific delay time is determined by the calibration filter; and adding calibration filter signal to the delay signal to obtain a calibrated transmitting signal.

6. The calibration method of claim 5, wherein the transmitter is a Direct-Conversion Transmitter.

7. The calibration method of claim 5, wherein the at least a calibration coefficient comprises a first calibration coefficient and a second calibration coefficient, wherein the first calibration coefficient is utilized for calibrating amplitude mismatches between the first signal path and the second signal path, and the second calibration coefficient is utilized for calibrating phase mismatches between the first signal path and the second signal path.

8. The calibration method of claim 5, wherein the step of deriving the tap coefficient of the calibration filter unit according to the equivalent frequency respond corresponding to each test signal comprises:

performing a discrete Fourier transform (DFT) for the equivalent frequency respond to generate a DFT result; and using the DFT result as the tap coefficient of the calibration filter unit.

9. A calibration apparatus for calibrating mismatches of a first signal path and a second signal path of a receiver, wherein one of the first signal path and the second signal path is an in-phase signal path and the other one of the first signal path and the second signal path is a quadrature signal path, the calibration apparatus comprising:

a single frequency calibration coefficient calculating unit, for respectively calculating at least a calibration coefficient for each test signal of at least a test signal via the first signal path and the second signal path so as to calibrate the mismatches between the first signal path and the second signal path of the receiver with respect to the specific frequency corresponding to each test signal, wherein each test signal possesses a specific frequency within a specific frequency band;

a calibration coefficient converting unit, for deriving an equivalent frequency respond corresponding to each test signal according to the at least a calibration coefficient of each test signal;

a spectrum analyzing unit, for deriving a tap coefficient of a calibration filter of a calibration filter unit according to the equivalent frequency respond corresponding to each test signal; and the calibration filter unit, for calibrating an image interference caused by mismatches of the first signal path and the second signal path of the receiver in the specific frequency band for a received signal;

wherein the calibration filter unit comprises:

the calibration filter, for making a conjugated signal of the received signal pass by the calibration filter of the calibration filter unit to generate a calibration filter signal after passing by the first signal path and the second signal path;

a delay circuit, for making the received signal pass a specific delay time to generate a delay signal after passing by the first signal path and the second signal path, wherein the specific delay time is determined by the calibration filter; and an adder, for adding calibration filter signal to the delay signal to obtain a calibrated received signal.

10. The calibration apparatus of claim 9, wherein the receiver is a Direct-Conversion Receiver.

11. The calibration apparatus of claim 9, wherein the at least a calibration coefficient comprises a first calibration coefficient and a second calibration coefficient, wherein the first calibration coefficient is utilized for calibrating amplitude mismatches between the first signal path and the second signal path, and the second calibration coefficient is utilized for calibrating phase mismatches between the first signal path and the second signal path.

12. The calibration apparatus of claim 9, wherein the spectrum analyzing unit comprises:
 a Fourier transform (DFT) unit, for performing a DFT for the equivalent frequency respond to generate a DFT result; and
 a tap coefficient generating unit, for using the DFT result as the tap coefficient of the calibration filter unit.

13. A calibration apparatus for calibrating mismatches of a first signal path and a second signal path of a transmitter, wherein one of the first signal path and the second signal path is an in-phase signal path and the other one of the first signal path and the second signal path is a quadrature signal path, the calibration apparatus comprising:
 a single frequency calibration coefficient calculating unit, for respectively calculating at least a calibration coefficient for each test signal of at least a test signal via the first signal path and the second signal path so as to calibrate the mismatches between the first signal path and the second signal path of the transmitter with respect to the specific frequency corresponding to each test signal, wherein each test signal possesses a specific frequency within a specific frequency band;
 a calibration coefficient converting unit, for deriving an equivalent frequency respond corresponding to each test signal according to the at least a calibration coefficient of each test signal;
 a spectrum analyzing unit, for deriving a tap coefficient of a calibration filter of a calibration filter unit according to the equivalent frequency respond corresponding to each test signal; and
 the calibration filter unit, for calibrating an image interference caused by mismatches of the first signal path and the second signal path of the transmitter in the specific frequency band for a transmitting signal about to be transmitted;
wherein the calibration filter unit comprises:
 the calibration filter, for making a conjugated signal of the transmitting signal about to be transmitted pass by the calibration filter of the calibration filter unit to generate a calibration filter signal after passing by the first signal path and the second signal path;
 a delay circuit, for making the transmitted signal pass a specific delay time to generate a delay signal after passing by the first signal path and the second signal path, wherein the specific delay time is determined by the calibration filter; and
 an adder, for adding calibration filter signal to the delay signal to obtain a calibrated transmitting signal.

14. The calibration apparatus of claim 13, wherein the transmitter is a Direct-Conversion Transmitter.

15. The calibration apparatus of claim 13, wherein the at least a calibration coefficient comprises a first calibration coefficient and a second calibration coefficient, wherein the first calibration coefficient is utilized for calibrating amplitude mismatches between the first signal path and the second signal path, and the second calibration coefficient is utilized for calibrating phase mismatches between the first signal path and the second signal path.

16. The calibration apparatus of claim 13, wherein the spectrum analyzing unit comprises:
 a Fourier transform (DFT) unit, for performing a DFT for the equivalent frequency respond to generate a DFT result; and
 a tap coefficient generating unit, for using the DFT result as the tap coefficient of the calibration filter unit.

* * * * *